UNITED STATES PATENT OFFICE 2,167,002

VITAMIN E COMPOSITION

August J. Pacini, Chicago, Ill., assignor, by mesne assignments, to U. S. Vitamin Corporation, New York, N. Y., a corporation of Delaware No Drawing. Application January 20, 1936, Serial No. 59,927

10 Claims. (Cl. 167—81)

This invention relates to vitamins, especially to vitamin E and to compositions containing the same.

It is among the objects of the present invention to improve such compositions by the addition thereto of certain substances capable of increasing the normal effects of the vitamin, or, in other words, increasing the potency and effectiveness thereof when administered.

In my copending application Ser. No. 59,926, filed January 20, 1936, entitled "Vitamin E composition", I have described broadly my discovery that when certain substances are added to oils, containing vitamin E, the effectiveness thereof may be multiplied a number of times. In said application I have described specifically the use of lecithin or the like in small amounts added to such oils, for example, wheat germ oil, whereby the desired result is accomplished.

In my studies of the problems involved in said improvements, I found that it is not necessary that substances of the specific type described in the above identified application be used, but that substances of quite a different character are also capable of giving the desired results. The present application is, therefore, directed to the use of such substances for the stated purpose.

It has been known for a considerable time that manganese in the form of its compounds, and preferably in combination with organic radicals, has a physiological effect on the living organism. It is known that manganese when administered in extremely small quantities is capable of stimulating the mating instinct in animals. The quantities generally considered sufficient and suitable to give this effect range from 0.0005 to 0.05% of manganese calculated to the metallic state in the diet. However, the administration of manganese did not give fertility to the animal and the degree of stimulation of the mating instinct did not increase if larger quantities than 0.05% of manganese were fed to the animal.

I have found that if manganese, usually in the form of its compounds, is added to a vitamin E composition, there is obtained a large increase in the effectiveness of the vitamin E. In other words, the presence of maganese multiplies the potency or effect of the vitamin several times in a manner similar to the effect of lecithin or the like, which is described in my aforesaid copending application.

While I have not definitely determined exactly the amounts of manganese necessary to give the desired results, I have found that the increase in effectiveness of vitamin E compositions may be obtained with wide variations in the amount of manganese added thereto. However, in all cases, the amount of manganese added is in a very minor proportion. Broadly speaking, I have found that when the amount of manganese in such composition is of the order of 0.05% or greater, it constitutes a sufficient amount of manganese to increase materially the effectiveness of the vitamin. I have conducted a series of experiments on white rats in the standard manner, as has been fully described in the literature and have found that increasing the percentage of manganese causes an increased effectiveness of the vitamin E until the effect has been multiplied by from three to five times. This degree of increased effectiveness is obtained when one adds to the vitamin composition from 0.1%–0.2% of manganese, in the form of its compounds.

My experiments indicate that increasing the amount of manganese over the upper limit stated above does not correspondingly increase the vitamin effect of the composition. In fact, it would appear that there is an upper limit of increased potency beyond which the substances which I add to the same have no substantial effect. This upper limit is probably about 0.5% of manganese, but this figure is not to be considered as even approximately correct, as my results having been obtained by experimentation on animals are naturally subject to the well known uncertainties involved in such work. However, the addition of larger quantities of manganese to the compositions has no serious disadvantages, as far as I have determined.

As an example of the present invention, I may take a cold pressed wheat germ oil, which has been suitably purified and clarified, and add thereto manganese oleate in such a quantity that the composition now contains about 0.1% of manganese. By test on white rats, this composition is shown to be about four times as effective as the same wheat germ oil prior to the treatment. Thereby, one may use one-fourth of the amount of the treated wheat germ oil to obtain the desired fertility in the animals.

Specifically, I have mentioned manganese oleate as the compound added to the oil. It is not necessary to use the oleate, but it is desirable to use a fatty acid compound and preferably a compound made with a higher fatty acid because of the ready solubility of such manganese compounds in the oils in which the vitamin E usually occurs. Other compounds of manganese may also be used with like results. Even compounds which are insoluble in the oil are adapted for my purpose provided there is substantially uniform dissemination thereof in the oil. This may be accomplished by a colloidal dispersion of the manganese compound. It might even be possible to use manganese in the metallic state provided it is sufficiently finely divided and can be maintained uniformly distributed in the oil.

Although I have described my invention setting forth a single specific embodiment thereof, it is apparent that the invention is susceptible of considerable variations within the scope thereof. For instance, the manganese compound may be used in conjunction with other oils containing vitamin E, such as egg yolk oil, soya bean oil, cotton seed oil, corn oil, and the like. It may also be added to other compositions of similar character not in the form of oils, as, for example, to ground wheat germ. Various salts of manganese, either organic or inorganic, are usable in the present invention, it being desirable, of course, to employ a compound which is readily miscible with or soluble in the vitamin composition. The final composition need not be in the form of an oil or a finely divided solid, but may be in the form of beads or pellets, and such compositions may contain other vitamins in suitable proportions, so as to obtain the combined effects of several vitamins in a single dose. These and other variations in my invention may be made within the spirit thereof, the scope of the invention being defined by the claims appended hereto.

What I claim is:

1. A composition of matter comprising a material containing significant amounts of vitamin E, and manganese distributed therein in an amount not less than 0.05%.

2. A composition of matter comprising a material containing significant amounts of vitamin E, and manganese distributed therein in an amount ranging from 0.05% to 0.5%.

3. A composition of matter comprising an oily material containing significant amounts of vitamin E and a manganese compound distributed therein sufficient in amount to enhance materially the effect of said vitamin, the amount thereof calculated as manganese being not less than 0.05%.

4. A composition of matter comprising wheat germ oil containing significant amounts of vitamin E and a manganese compound distributed therein sufficient in amount to enhance materially the effect of said vitamin, the amount thereof calculated as manganese being not less than 0.05%.

5. A composition of matter comprising an oily material containing significant amounts of vitamin E and an oil soluble manganese salt therein sufficient in amount to enhance materially the effect of said vitamin.

6. A composition of matter comprising an oily material containing significant amounts of vitamin E and an oil soluble manganese salt therein sufficient in amount to enhance materially the effect of said vitamin, the amount thereof calculated as manganese being not less than 0.05%.

7. A composition of matter comprising a material containing a significant amount of vitamin E and manganese oleate in an amount sufficient to enhance materially the effect of the vitamin distributed in said material.

8. A composition of matter comprising an oily material containing a significant amount of vitamin E and manganese oleate distributed therein in an amount sufficient to enhance materially the effect of the vitamin E, said amount calculated as manganese being not less than 0.05%.

9. A composition of matter comprising wheat germ oil containing a significant amount of vitamin E and manganese oleate distributed therein in an amount calculated as manganese ranging from 0.05 to 0.5%.

10. A composition of matter comprising wheat germ oil containing significant amounts of vitamin E, and manganese distributed therein in an amount not less than 0.05%.

AUGUST J. PACINI.